United States Patent
Dören

(10) Patent No.: US 10,283,888 B2
(45) Date of Patent: May 7, 2019

(54) ELECTRICAL CONNECTION ELEMENT, PROCESS TO MANUFACTURE AN ELECTRICAL CONNECTION ELEMENT AND USE OF AN ELECTRICAL CONNECTION ELEMENT

(71) Applicant: Auto-Kabel Management GmbH, Hausen i.W. (DE)

(72) Inventor: Jens Dören, Jülich (DE)

(73) Assignee: Auto-Kabel Management GmbH, Hausen, i.W. (DE)

( * ) Notice: Subject to any disclaimer, the term of this patent is extended or adjusted under 35 U.S.C. 154(b) by 0 days.

(21) Appl. No.: 15/500,770

(22) PCT Filed: May 21, 2015

(86) PCT No.: PCT/EP2015/061221
§ 371 (c)(1),
(2) Date: Jan. 31, 2017

(87) PCT Pub. No.: WO2016/023653
PCT Pub. Date: Feb. 18, 2016

(65) Prior Publication Data
US 2017/0222345 A1 Aug. 3, 2017

(30) Foreign Application Priority Data
Aug. 13, 2014 (DE) .................. 10 2014 011 887

(51) Int. Cl.
*H01R 13/03* (2006.01)
*H01R 43/16* (2006.01)
(Continued)

(52) U.S. Cl.
CPC ......... *H01R 13/03* (2013.01); *B23K 20/1215* (2013.01); *C23C 26/00* (2013.01);
(Continued)

(58) Field of Classification Search
CPC ...................................................... H01R 13/03
(Continued)

(56) References Cited

U.S. PATENT DOCUMENTS 3,535,781 A * 10/1970 Comey, Jr. .......... H01H 11/045
205/152
4,125,936 A * 11/1978 Rozmus ................. H01R 43/16
29/879
(Continued)

FOREIGN PATENT DOCUMENTS

CN 1113039 A 12/1995
CN 101128888 A 2/2008
(Continued)

OTHER PUBLICATIONS

Gandra et al., "Friction surfacing—A review," Journal of Materials Processing Technology, vol. 2014, Ussie 5, pp. 1062-1093, May 2014.
(Continued)

*Primary Examiner* — Tho D Ta
*Assistant Examiner* — Marcus E Harcum
(74) *Attorney, Agent, or Firm* — Sunstein Kann Murphy & Timbers LLP

(57) ABSTRACT

Electrical connection element having a first flat part made of a metallic substrate and a metallic contact layer applied to one surface of the substrate. A reliable coating is possible through the substrate being friction coated with the contact layer.

6 Claims, 2 Drawing Sheets

Figure 4:
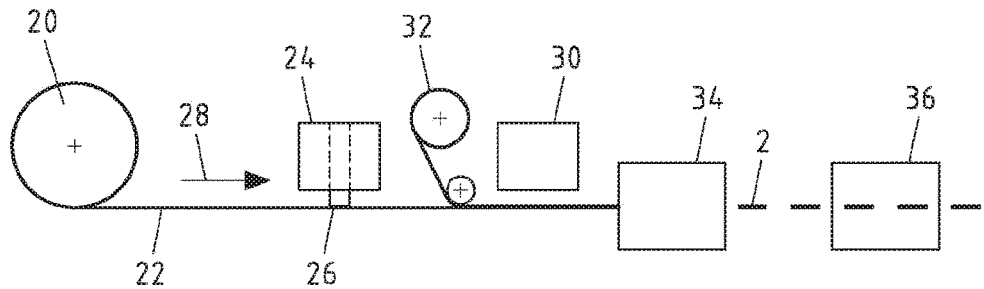

(51) Int. Cl.
  *H01R 4/62*  (2006.01)
  *C23C 26/00*  (2006.01)
  *B23K 20/12*  (2006.01)
  *H01R 4/28*  (2006.01)
  *H01R 4/02*  (2006.01)
  *H01R 11/12*  (2006.01)
  *H01R 43/02*  (2006.01)

(52) U.S. Cl.
  CPC .............. *H01R 4/28* (2013.01); *H01R 4/62* (2013.01); *H01R 43/16* (2013.01); *H01R 4/029* (2013.01); *H01R 11/12* (2013.01); *H01R 43/0207* (2013.01)

(58) Field of Classification Search
  USPC ......................................................... 439/886
  See application file for complete search history.

(56) References Cited

U.S. PATENT DOCUMENTS

| | | | | |
|---|---|---|---|---|
| 5,235,743 | A * | 8/1993 | Endo ................. | H01R 13/03 29/874 |
| 6,150,186 | A * | 11/2000 | Chen ................. | B23K 20/004 438/14 |
| 7,163,753 | B2 * | 1/2007 | Ota ................... | H01R 13/03 428/647 |
| 7,598,456 | B2 | 10/2009 | Mertel ............... | 174/84 R |
| 8,475,102 | B2 | 7/2013 | Haylock et al. | |
| 8,658,901 | B2 | 2/2014 | Scholms et al. | |
| 2011/0114363 | A1 * | 5/2011 | Schloms ........... | H01R 13/03 174/117 F |
| 2013/0084759 | A1 * | 4/2013 | Mizuta .............. | H01R 13/03 439/733.1 |
| 2014/0254970 | A1 * | 9/2014 | Guilford ........... | F16C 13/006 384/569 |
| 2015/0357732 | A1 * | 12/2015 | Casses .............. | H01R 11/288 439/754 |
| 2016/0104631 | A1 * | 4/2016 | Guth ................. | H01L 21/4817 361/728 |

FOREIGN PATENT DOCUMENTS

| | | | |
|---|---|---|---|
| CN | 102113177 A | 6/2011 | |
| CN | 202023812 U | 11/2011 | |
| DE | 39 41 056 A1 | 6/1991 | ............. H01R 43/02 |
| DE | 10 2006 050 709 B3 | 5/2008 | ............... H01R 4/02 |
| DE | 10 2006 055 994 A1 | 5/2008 | ............. C23C 26/00 |
| DE | 20 2008 017 220 U1 | 4/2009 | ............. H01R 4/62 |
| DE | 10 2008 035 863 A1 | 2/2010 | ............. H01R 4/62 |
| DE | 10 2012 001 779 A1 | 8/2013 | ............. B23K 20/12 |
| DE | 10 2012 006 641 A1 | 10/2013 | ............. H01R 4/38 |
| EP | 0 474 455 A2 | 3/1992 | |
| EP | 0 666 614 A1 | 1/1995 | ............. H01R 4/62 |
| FR | 1365426 | 7/1964 | ............. B23K 20/12 |
| WO | WO 2006/051121 A1 | 5/2006 | ............. H01B 7/00 |

OTHER PUBLICATIONS

Nicholas et al., "Metal Deposition by Friction Welding," Welding Journal, American Welding Society, vol. 8, pp. 17-27, Aug. 1986.
International Searching Authority, International Search Report—International Application No. PCT/EP2015/061221, dated Jul. 21, 2015, together with the Written Opinion of the International Searching Authority, 10 pages (in German).
International Preliminary Examining Authority, International Preliminary Report on Patentability—International Application No. PCT/EP2015/061221, dated Nov. 10, 2016, 21 pages (in German).
Chinese Patent Office, Notification of First Office Action—Application No. 201580043383.3, dated May 2, 2018, 10 pages.
Chinese Patent Office, Notification of First Office Action—Application No. 201580043383.3, dated May 2, 2018, 15 pages (English translation).
State Intellectual Property Office of P.R.C., Notification of the Second Office Action, Appl. No. 201580043383.3, dated Nov. 15, 2018, 25 Pages, with English translation.

* cited by examiner

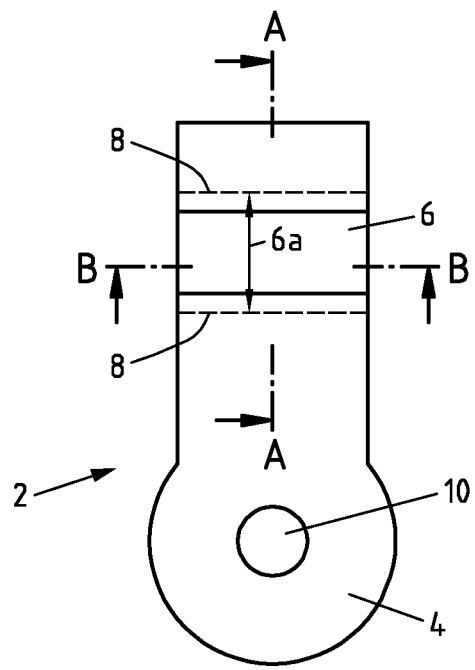
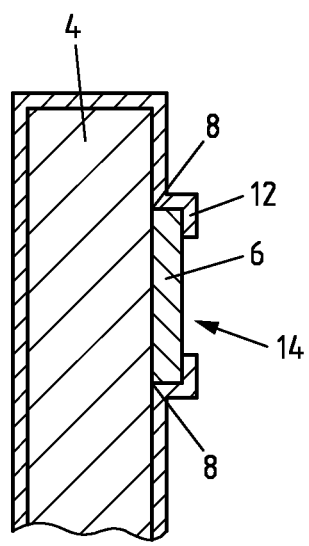
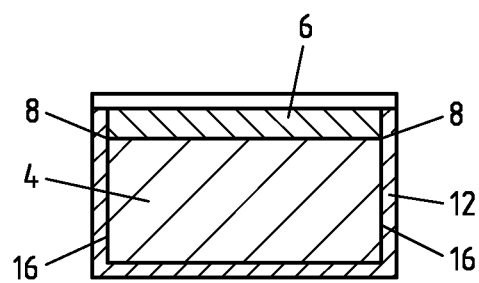
Fig.1
Fig.2
Fig.3

ELECTRICAL CONNECTION ELEMENT, PROCESS TO MANUFACTURE AN ELECTRICAL CONNECTION ELEMENT AND USE OF AN ELECTRICAL CONNECTION ELEMENT

The subject matter relates to an electrical connection element, in particular for an electric vehicle power line and a process for manufacturing an electrical connection element of this type.

Connection elements, in particular vehicle conductor connection elements are for example known from the international publication WO 2010/012515 A1. These connection elements are used to connect cables made of different metals. In particular, the connection elements are used to connect aluminium cables to copper cables. In order to do this, a metallic insert is provided on the surface of the connection element which is formed from a different metal to the connection element itself. In this way, it is possible to connect the connection element on the one hand to an electrical cable, for example an aluminium cable, and on the other hand to the metallic coating which for example is formed from copper or a copper alloy to connect a copper cable.

However, what is disadvantageous about this connection element is the laborious and cost-intensive manufacture. In particular, the contact layer is placed on the connection element by means of roll cladding. This roll cladding, however, is considerably too expensive for low numbers of items.

In order to provide even for small batches of connection elements which enable the connection of various metals, a more efficient coating of the connection elements is necessary.

The object of the invention was therefore to provide a connection element which is suitable for the connection of two electrical conductors and at the same time is technically simple and efficient to manufacture.

It has been found that as an alternative process to the conventional roll cladding, the application of the contact layer by means of friction coating is particularly advantageous. The substrate from which the flat part of the connection element is formed is coated with a contact layer of metal by means of friction coating. In doing this, it is possible to apply the contact layer advantageously onto the substrate in a continuous process. By means of the friction coating of the substrate with the contact part, it is also possible to coat even individual parts in a non-continuous process in an efficient manner.

During friction coating a rotating rod made of the metal on the contact layer is advantageously guided over the substrate. During this process, the rod is pressed onto the substrate with a force and caused to rotate or oscillate. At the same time the rod is moved in a translational manner along a path along which the contact layer is to be applied to the substrate.

Frictional heat is generated by means of the rotation or oscillation of the rod and the simultaneous contact with the substrate. The material of the rod and therefore the material of the contact layer preferably has a lower melting temperature than the metal of the substrate. Through the input of heat into the contact area between the rod and the substrate, part of the material of the rod remains adhered to the substrate and forms the contact layer. At the same time, there is a relative movement between the rod and the substrate along the path along which the contact layer is to be applied. The movement along this path generates a strip of the contact layer which adheres to the substrate.

Friction coating therefore means it is possible to connect different metals with one another in a particularly cost-efficient process such that a connection element is generated which is suitable for the connection of two electrical conductors, in particular made from different metal materials.

The substrate and the contact layer are preferably made of different metals, in particular metals with different electrode potentials. In particular, it is possible for the substrate to be formed from a non-ferrous metal or an alloy thereof and the contact layer to be made of aluminium or an alloy thereof. Copper or copper alloys are particularly suitable as substrates. In this case, it is possible to arrange a copper cable at the substrate and an aluminium cable at the contact layer. A connection of a single type can occur at the respective transitions and contact corrosion at these transitions is decreased or even avoided.

It is also possible to form the substrate from aluminium or an aluminium alloy and to form the contact layer from non-ferrous metal or an alloy thereof, for example from copper or a copper alloy. An aluminium conductor can then be arranged at the substrate, for example a flat aluminium cable, for example made of full material, for example with a rectangular cross-section and preferably made of high purity aluminium, for example aluminium 99.5. A contact with a copper conductor can be made on the contact layer. This makes it possible to contact battery cables frequently used as aluminium cables with vehicle electronics in a particularly simple manner by the vehicle electronics or the copper conductors built into them being connected to the contact layer.

According to an embodiment, it is proposed that the contact layer be applied to a part of the surface of the substrate. During application to the surface of the substrate, joints are generated between the substrate and the contact layer. These joints can be the transitions at which the contact layer ends and the substrate begins. In particular, in the case of a translational movement between the substrate and the rod along a path (a trajectory), the joint can have a corresponding path. In particular, the width of the contact layer roughly corresponds to the diameter of the rod. The joint between the substrate and the contact layer is generated on the respective outer layers of the rod.

From an economical process perspective, it is advantageous if the contact layer is applied to the substrate as a flat strip. This flat strip is preferably formed transverse to the longitudinal direction of the flat part on the surface of the substrate. The flat strip has a strip width corresponding to the diameter of the rod which is effective during friction coating. The course of the strip follows the path which is defined by the relative movement between the substrate and the rod.

According to an embodiment, it is proposed that the substrate is at least partially coated with a coating. The coating is preferably metallic. In particular, the coating is formed from tin and/or nickel or alloys thereof. The coating can also be formed from a copper alloy. The aim of the coating is to avoid contact corrosion at the joint between the substrate and the contact layer. In order to do this, it is advantageous if the coating is arranged in the region of the joint and covers the joint. However, in order to enable a single-type connection on the contact layer with an electrical contact part, the contact layer is not completely coated with the coating. Rather, the contact layer is merely coated with the coating in the region of the joint. The coating therefore covers the joint both in the region of the contact layer and in the region of the substrate. A transition between the contact layer and the substrate is covered by the coating.

Figure 6:
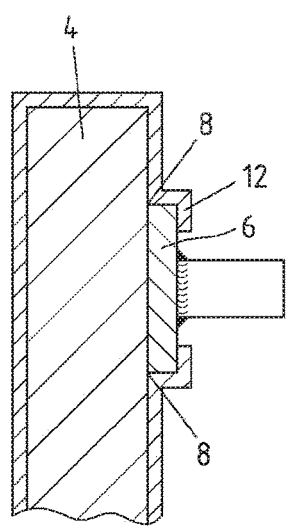

As previously mentioned, the contact layer is suitable to be contacted with an electrical conductor or another contact part. In particular, as shown in FIG. 6, a contact part can be welded on the contact layer. In particular, the contact part can be welded on to the contact layer by means of ultrasonic welding. This is in particular advantageous if the contact part and the contact layer are formed from aluminium or aluminium alloys. During ultrasonic welding the aluminium oxide layers formed there are broken open and a highly conductive transition is generated between the contact layer and the contact part.

This is preferably possible when the contact layer has a region that is free from the coating. For this reason, it is suggested that the contact layer be free from the coating in a central area at a distance from at least one of the joints. The contact layer is preferably coated along all joints with the substrate. The contact layer, however, is in a central area which is at a distance from the joints and free from the coating such that a connection with a contact part of an electrical conductor is possible there.

A connection element can be manufactured in a continuous process in a particularly easy manner if the substrate is provided as a strip or a sheet. In particular, the substrate is provided as a strip or a sheet in a continuous process. In this the substrate is preferably moved under a friction coating rod and the friction coating rod applies the contact layer continuously onto the substrate. This can for example be carried out in an infinite process until the strip or the sheet has been completely used up or the friction coating rod has been used up.

After the friction coating the flat part can be separated out from the substrate, for example it can be punched or cut.

If the relative movement between the friction coating rod and the substrate is defined by the propulsion of the strip or the sheet, the application of the contact layer is along the direction of propulsion of the strip or sheet. The strip or sheet is continuously driven underneath the friction coating rod while this rotates or oscillates and is pressed onto the substrate with a force.

Figure 5:
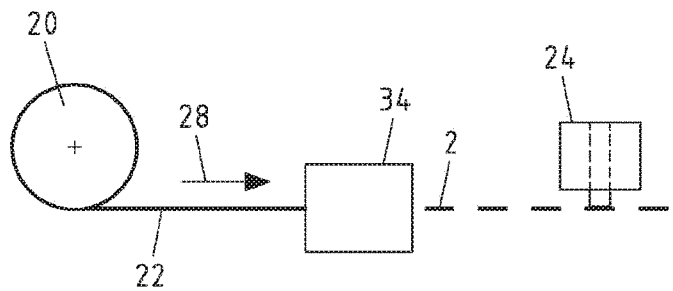

It is also possible as illustrated in FIG. 5 that the flat part will initially be separated out from the substrate which has not yet been coated with the contact layer. After this separation, each individual flat part can be coated with the contact layer by means of friction coating. While this process is somewhat more laborious than continuous coating, it is however particularly suitable for small batches as the friction coating is then not carried out continuously on the strip or the sheet but rather individually on an individual part. A further advantage of individual coating is that the separation of the flat part from the substrate is carried out in a segregated manner. This means that rejects, for example in the event of incorrect punching or incorrect cutting of the flat parts remain segregated and can be fed on for recycling.

According to an embodiment, it is proposed that an electrical conductor is connected to the contact layer in a bonded connection. This is preferably the case in the central area. This central area is at a distance from at least one of the joints. A welding of the conductor or the electrical contact part to the contact layer is particularly advantageous here. Ultrasonic welding is particularly suitable for this.

If the flat part is separated from the substrate with the coating of the substrate with the contact layer, a joint is generated on the lateral surfaces of the flat part. These lateral surfaces are the surfaces of the flat part which are adjacent to the surface on which the contact layer is applied to the substrate. In particular, a joint is generated on each of two opposing lateral surfaces of the flat part.

This joint is preferably also sealed with the coating during a subsequent coating process. The coating can be a dip coating, a powder coating, a painting or the like. In this process, the joint is covered by the preferably metallic coating on the lateral surfaces too.

The contact layer is preferably masked in a central area, which means that it is covered during the coating so the coating material cannot penetrate underneath the cover on the contact layer. In particular, this cover is in parallel to the direction of extension of the contact layer. The cover is preferably somewhat narrower than the contact layer, so there is a distance from the joint on opposite sides of the cover.

In a subsequent coating, the material covers the coating of the contact layer in the non-covered areas such that the coating covers the joint completely between the contact layer and the substrate. The coating on the joint also penetrates the lateral surfaces so after the coating and where applicable after the removal of the cover only the covered area of the contact layer and therefore the central area of the contact layer are free from the coating.

According to one aspect, a process for the manufacture of a connection element is proposed. In particular, this is a connection element as described above. In this process, a substrate is coated with a contact layer. The coating is carried out by means of friction coating. During friction coating, a rod or pin made of a coating material is pressed onto the substrate. The rod or the pin is then rotated or oscillated. A relative movement, in particular a translational relative movement, between the substrate and the rod or the pin is effected. As a result of the relative movement, the rod or the pin made of the coating material moves along this direction or movement over the substrate. The rotation or oscillation generates heat and the material of the rod or pin, in particular aluminium, remains adhered to the substrate, in particular copper.

After the application of the contact layer, this is protected from contact corrosion on the joint by the substrate and the contact layer being coated with a preferably metallic coating. This coating can for example be galvanic or be applied in an immersion bath. However, the coating is preferably not on the entire contact layer, but rather part of the contact layer remains free from the coating. In order to do this, the contact layer is kept at a distance of at least one, preferably all of the joints between the contact layer and the substrate. This can be achieved by means of a covering or masking of a part of the contact layer which lies outside of the joint.

According to an embodiment, it is proposed that once the contact layer has been applied to the substrate the contact layer should be masked and then coated in a central area at a distance of at least one, preferably all of the joints. The masking prevents the coating coming into contact with the contact layer in the masked area.

According to an embodiment, it is proposed that the substrate is provided continuously as a strip or a sheet. For example, the substrate can be wound into a coil.

During the feeding of the substrate, the substrate can be coated with the contact layer by means of friction coating along the feeding direction, in other words along the longitudinal direction of the strip or sheet. The flat part can then be separated from the strip or sheet, in particular it can be stamped or cut. Before the separation, however, the masking of the strip or sheet can be carried out, for example by a masking film being placed on a central area of the contact layer at a distance from the two joints on the contact layer.

After the separation of the flat part from the strip or sheet, the masking is still on the contact layer and in a subsequent coating process the coating can be carried out in such a way that that the covered area of the contact layer is not coated. The coating then simply has to be removed and the connection element has a coated area of the substrate and an uncoated area of the contact layer. A homogeneous (only one type of material) connection can be made on the contact layer. In particular, the contact layer can be made of aluminium and the contact part arranged on the contact layer can also be made of aluminium.

The use of a connection element of this type in a vehicle, in particular as an electric vehicle power line, is advantageous. In a vehicle, the electrical connections are exposed to significant environmental impacts in the form of spray, gritting salt, temperature fluctuations and the like. Contact corrosion caused by non-homogeneous connections is accelerated in this way. In order to prevent this, the connection element which is the subject matter is particularly suitable since homogeneous connections between two contact parts, in particular electrical conductors made of different metals via the connection element, are possible.

The subject matter is described in greater detail below by means of figures showing embodiments of the invention. In the drawings show:

FIG. 1 a plan view of a connection element according to an embodiment;

FIG. 2 a sectional view of a connection element;

FIG. 3 a further sectional view a connection element;

FIG. 4 a schematic structure of a manufacturing facility;

FIG. 5 a schematic structure of an alternative manufacturing approach;

FIG. 6 a sectional view of a connection element with a contact part welded to it.

FIG. 1 shows a connection element 2 which is formed from a flat part 4 and a contact layer 6. The connection element 2 is preferably a vehicle conductor connection element 2. A vehicle conductor connection element 2 is described below in a manner representative of all other contact elements. The vehicle conductor connection element 2 has, as shown in FIG. 1, two joints 8 between the substrate of the flat part 4 and a contact layer 6. The joints 8 are shown with a dotted line in FIG. 1 as a coating is placed on the connection element 2 over the joints 8. The coating is preferably a metallic coating. In particular, the coating can be formed from tin, nickel, alloys thereof or the like.

As shown in FIG. 1, the connection element 2 can be formed as a connecting lug and have a hole 10 to receive for example a screw or a bolt.

The contact layer 6 is placed on the connection element 2 by means of friction coating. In order to do this, a basic material is rubbed onto the surface of the flat part 4. The basic material is provided by means of a friction rod or a friction pin and remains adhered to the substrate of the flat part 4. The width 6a of the contact layer 6 is derived from the diameter of the friction rod or friction pin which is effective during the friction coating. The joints 8 are created on the outer ends of the contact layer 6.

FIG. 2 shows a sectional view A-A through the connection element 2 according to FIG. 1. It should be noted that the contact layer 6 is applied to a surface of the substrate of the flat part 4. Joints 8 are created on the outer edges of the contact layer 6 between the flat part 4 and the contact layer 6, which joints moisture can attack and on which joints contact corrosion can occur.

In order to protect these joints 8, in particular because the thickness of the contact layer 6 is between a number of micrometers and a number of millimeters and can quickly be destroyed by contact corrosion, the contact layer is coated with a metallic coating 12 in the area of the joints 8. A complete coating 12 of the flat part 4 is shown, but this can also be on just a partial area of the surface of the flat part 4. During coating, a galvanic coating, a coating using dip painting, a coating using powder coating or any another method of coating can for example be used.

Furthermore, FIG. 2 shows that a central area 14 of the contact layer 6 is free from the coating 12. The central area 14 is at a distance from the joints 8.

FIG. 3 shows a sectional view B-B through the connection element 2 according to FIG. 1. It should be noted that the metallic coating 12 completely covers the joints 8 on the lateral surfaces of the flat part 4.

FIG. 4 shows the manufacture of a connection element. Initially, a strip 22 can be rolled from a coil 20. The strip 22 is preferably a few centimeters wide and has a thickness of a few millimeters.

The strip 22 is initially passed by a friction coating device 24 in the direction of feeding 28. In the friction coating device 24, a friction rod 26, which is for example formed from aluminium, is pressed onto the strip 22, which is for example formed from copper, and rotated at the same time. The strip 22 is guided underneath the rod 26 in the direction of movement 28 while this rotates or oscillates. The rotation or oscillation of the rod 26 and the pressing on the strip results in heat at the point of contact and the material of the rod 26 remains adhered to the strip 22 as a contact layer 6.

The strip 22 coated with the contact layer 6 can then be fed into a masking device 30. In this masking device, a protective element 32, for example an adhesive film or another film-like coating, can be applied to the central area 14 of the contact layer 6 and fixed there.

The masked and coated strip 22 can then be fed into a punch 34. In the punch 34 the connection elements 2 are stamped from the strip 22 and for example guided to a coating device 36 as stamped goods or cut goods.

In the coating device 36 the connection element 2 is coated. The central area 14 of the contact layer 6 which was previously masked is not coated at the same time.

The masking can then be removed and the connection element 2 is free from the coating 12 in the central area 14 of the contact layer 6 and otherwise fully coated with the coating 12.

With a connection element of this type, it is possible to connect an aluminium cable to a copper cable, thereby ensuring homogenous connections to the connection element.

The invention claimed is:

1. A process for the manufacture of a connection element comprising:

providing a metallic substrate having a first flat part;

friction coating a surface of the substrate using a rotating metal rod that simultaneously is moved in a translational manner along a path along which a metallic contact layer is applied, wherein the metallic contact layer is made from a different metal than the metallic substrate, wherein one of the metals is copper or a copper alloy and the other one of the metals is aluminium or aluminium alloy.

2. The process according to claim 1, further comprising coating the substrate and the contact layer with a metallic coating such that the contact layer is free from the coating in a central area at a distance from at least one joint between the contact layer and the substrate.

3. The process according to claim 1, further comprising masking a central area of the contact layer after the contact layer has been applied to the substrate and coating the contact layer along at least one joint between the contact layer and the substrate, wherein the coating extends a distance from the at least one joint toward the central area.

4. The process according to claim 2, wherein coating comprises galvanizing.

5. The process according to claim 1, wherein the substrate is provided continuously as a strip or a sheet, and friction coating takes place along the longitudinal direction of the strip or sheet, further comprising separating the flat part from the strip or sheet after coating the flat part.

6. The process according to claim 1, wherein the substrate is provided continuously as a strip or a sheet, further comprising separating the flat part from the strip or sheet and coating the flat part after the separation of the flat part from the strip or sheet.

* * * * *